United States Patent [19]
Annesser et al.

[11] 3,962,405
[45] June 8, 1976

[54] PROCESS FOR THE REMOVAL OF SULFUR OXIDES FROM WASTE GASES

[75] Inventors: Richard J. Annesser, Berkeley; Robert J. Klett, San Francisco, both of Calif.

[73] Assignee: Chevron Research Company, San Francisco, Calif.

[22] Filed: Apr. 16, 1973

[21] Appl. No.: 351,420

[52] U.S. Cl. ............................................. 423/242
[51] Int. Cl.$^2$ ........................................ C01B 17/00
[58] Field of Search ............................ 423/242, 512

[56] References Cited
UNITED STATES PATENTS

| | | | |
|---|---|---|---|
| 2,615,787 | 10/1952 | Randlett | 423/242 |
| 3,285,711 | 11/1966 | Stanford | 423/242 |
| 3,428,420 | 2/1969 | Douglas et al. | 423/519 |
| 3,428,424 | 2/1969 | Keith | 423/393 |
| 3,653,812 | 9/1972 | Schneider et al. | 423/242 |
| 3,832,444 | 8/1974 | Doyle | 423/242 |

OTHER PUBLICATIONS
Industrial & Engineering Chemistry – vol. 30, No. 1, p. 103, Recovery of $SO_2$ From Waste Gases – Johnstone et al.

*Primary Examiner*—Oscar R. Vertiz
*Assistant Examiner*—Eugene T. Wheelock
*Attorney, Agent, or Firm*—G. F. Magdeburger; R. H. Davies; D. L. Hagmann

[57] ABSTRACT

The effectiveness of gas scrubbing process for the removal of sulfur dioxide from a sulfur-dioxide-containing gas is improved by employing an integrated scrubbing process.

4 Claims, 1 Drawing Figure

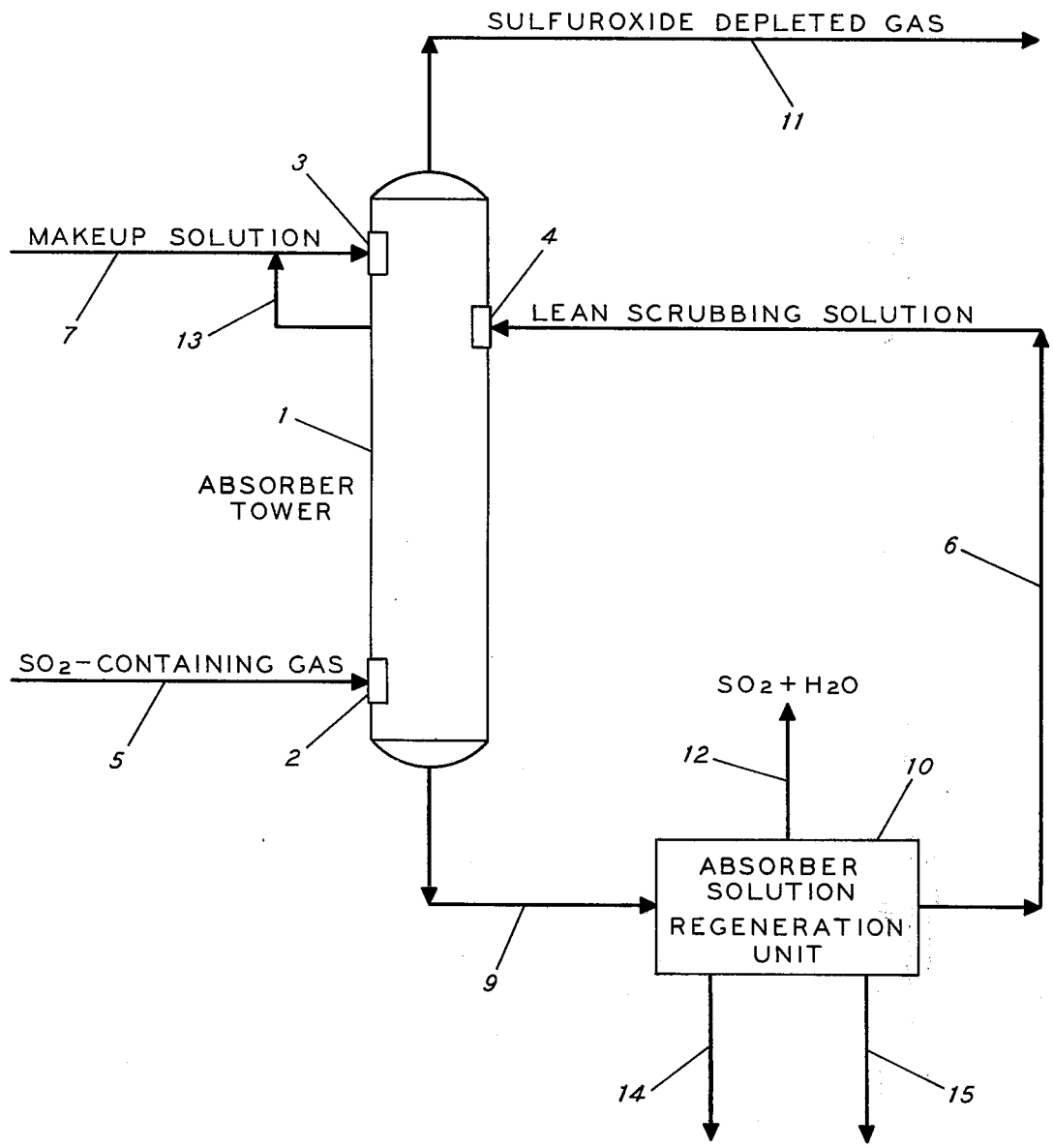

PROCESS FOR THE REMOVAL OF SULFUR OXIDES FROM WASTE GASES

BACKGROUND OF THE INVENTION

1. Field of the Invention

This invention relates to a process for the removal of sulfur dioxide from a gas mixture. More particularly, it relates to an improved process for the removal of sulfur dioxide from a waste gas stream in which the gas is scrubbed by an aqueous sulfite-containing scrubbing liquid.

2. Description of the Prior Art

Gas scrubbing methods are known and practiced commercially for the removal of sulfur dioxide from a waste gas stream. However, these methods are unsatisfactory, particularly from an environmental protection view, in that the effluent gas stream from a conventional process still contains an appreciable amount of sulfur dioxide. At least a partial solution could be obtained by adding one or more additional units of absorbing capacity to the process train. But this would put a rather substantial cost increase upon the process. A better answer to the problem would be to increase the efficiency of a conventional gas scrubbing process. Thus there is a need for an improved process for the economical removal of sulfur dioxide from a sulfur-dioxide-containing gas stream.

A reference which describes current practices in the removal of sulfur dioxide from a gas stream is the series of articles in the publication "Chemical Engineering Progress", August 1972, pp. 43–56. Other references include U.S. Pat. Nos. 3,607,001, 3,645,671 and 3,653,812.

The use of caustic as a scrubbing agent is discussed in U.S. Pat. No. 1,271,899 and British Patents 132,661 and 1427, of 1883.

SUMMARY OF THE INVENTION

The efficiency of a gas scrubbing process for the removal of sulfur dioxide from a sulfur-dioxide-containing gas is improved by first scrubbing the gas with a lean aqueous scrubbing solution and then scrubbing the partially depleted gas with fresh aqueous caustic makeup solution. The lean scrubbing solution is a mixture of regenerated and recycled scrubbing solution and of the used fresh aqueous caustic makeup scrubbing solution. At least sufficient of the makeup solution should be employed to maintain the process in balance and to provide a degree of gas scrubbing corresponding to at least the equivalent of a single tray in a tray-type gas scrubbing tower. In conventional practice, the lean scrubbing solution, a mixture of the regenerated and recycled scrubbing liquid stream, in first combined with fresh aqueous caustic makeup scrubbing solution before contacting the scrubbing agent with a gas stream, for example in a scrubbing tower. Under these conditions, the sulfur-dioxide content of the effluent gas stream is sufficiently reduced to meet current antipollution standards, that is, to a content of no greater than 250–500 ppm of sulfur dioxide. However, even this amount may be excessive in terms of environmental effects. Surprisingly, the present improvement results in a substantial reduction of the sulfur-dioxide content in the effluent gas stream, i.e., to a value which may be less than about 75 ppm.

Preferably the process of the invention is carried out by using a countercurrent gas absorption tower. The sulfur-dioxide-containing gas is passed into the tower via a port located near the bottom of the tower, the recycled and regenerated scrubbing liquid is introduced via a port located above the gas port, and the fresh aqueous caustic makeup scrubbing liquid is introduced into the tower via a port above the recycle liquid port.

By a "gas absorption tower" is meant gas absorption towers in general, and in particular packed-, tray- and spray-type towers ordinarily used where efficient contacting of a gas with a liquid absorption medium is required.

The FIGURE is a schematic flow diagram of a process employing the present invention for the removal and recovery of sulfur dioxide from a gas.

EMBODIMENT

Referring now to the FIGURE, a multi-tray gas absorber tower, 1, is used for the scrubbing of the combustion product gas stream, a flue gas, from a boiler fueled by a sulfur-containing hydrocarbon. The tower contains input ports 2, 3 and 4 for the introduction of sulfur-dioxide-containing gas, makeup solution, and lean recycled and regenerated scrubbing solution, respectively. Port 2 is located at a lower portion of the tower, port 3 is located at an upper portion of the tower, and port 4 is located at a central portion of the tower. The distance between ports 3 and 4 is sufficient to accommodate at least one absorber tray between these ports. Via line 5 and port 2 the combustion product gas stream from a boiler (not shown) is introduced into the tower. Regenerated lean scrubbing solution is introduced into tower 1 via port 4 and line 6, and makeup aqueous caustic scrubbing solution is introduced via port 3 and line 7. The makeup solution passes downward in the tower and intermixes with the recycled lean scrubbing solution in the neighborhood of port 4. Line 13 provides for recycle of makeup solution as desired. The combined solutions pass downward through the tower and are exited as spent or fat scrubbing solution from the tower via line 9 for delivery to absorber solution regeneration unit 10.

The sulfur-dioxide-containing gas passes upward in the tower countercurrent to the flow of the combined scrubbing solutions and upon reaching the environ of port 4 has a substantially reduced sulfur-dioxide content, for example about 250 ppm (weight). During the further upward course of the partially scrubbed gas, contact is made with the fresh aqueous caustic makeup solution, and finally the well-scrubbed gas is exited from the tower via line 11 for discard from the process system.

The fat (sulfur-dioxide rich) scrubbing liquid delivered to regenerator unit 10 via line 9 is regenerated in a conventional manner, for example by steam stripping, to remove sulfur dioxide and water vapor, which are withdrawn from the regenerator via line 12 and passed to a suitable and conventional sulfur-dioxide-recovery unit (not shown).

Via line 14, a mother liquor bleed stream is withdrawn from the regeneration unit for recovery or disposal, and via line 15 reject solid, for example precipitated alkali metal sulfate, is withdrawn from the unit for disposal.

The conditions for the regeneration of the spent absorbing solution are ordinary and may vary, depending upon such factors as the sulfur-dioxide loading, the relative amount of sulfur trioxide in the gas feed, the temperature and pressure conditions desirably employed, and the like (see, for example, U.S. Pat. Nos. 3,653,812, 3,645,671, 3,607,001 and 2,122,544).

Routinely employed elements, such as auxiliary process elements, pumps, heat exchangers, stirrers, and the like, have been omitted from the FIGURE as being within the ordinary skill of the art. On the other hand, line 13 is included to represent an internal recycle means useful for balancing the flow for the process where makeup feed rates are desirably minimal, as where the sulfur-dioxide-containing feed gas contains relatively little of the sulfur-oxide gases ($SO_2$ and $SO_3$). The gas scrubbing section, for example in the absorber tower, may vary, depending upon the usual process variables.

Conventional gas scrubbing conditions include the efficient contacting of the gas with an absorption liquid at a temperature in the range roughly from 50° to 250°F., a pressure in the range from subatmospheric to 5 atmospheres, a concentration of sulfite salts (see equation 4 below) in the scrubbing solution in the range roughly from 10 to 35 weight percent, and flow rates (contact times) which result in the reduction of the partial pressure of the sulfur dioxide in the gas to a value which for practical purposes closely approaches the equilibrium value. While any efficient contacting means, including stirred tanks, venturi nozzles and the like mixing devices are suitable, usually, and for practical reasons, an efficient gas scrubbing tower having a design and construction well known in the art and utilizing gravity flow of the scrubbing liquid and countercurrent flow of the gas feed is employed. The principal reactions involved in the absorption may be represented as follows:

(1) $Na_2SO_3 + SO_2 + H_2O \rightarrow 2NaHSO_3$ 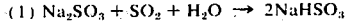

(2) $SO_3 + Na_2SO_3 \rightarrow Na_2SO_4 + SO_2$ 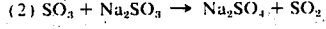

(3) $2NaOH + SO_2 \rightarrow Na_2SO_3 + H_2O$ 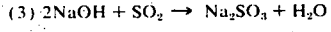

and in the regeneration (desorption):

(4) $2NaHSO_3 \rightarrow Na_2SO_3 + H_2O + SO_2$ 

Temperatures employed for the regeneration are conventional, and are usually in the range 175°F. to 400°F. The pressure employed is low enough to facilitate efficient vaporization of water, i.e., a subatmospheric pressure for a low temperature and perhaps as high as 5 atmospheres where an elevated temperature is employed. The time required for the regeneration varies for the usual reasons, and is in general in the range 0.5 to 4 hours.

Feed gases suitable for use and contemplated for use in the process of the present invention are sulfur-dioxide-containing gases which contain a moderate amount of sulfur dioxide, that is, an amount in excess of about 100 ppm (weight) and below a large amount for which other recovery means are more practicable (condensation, etc.), i.e., below about a 50 volume percent content of sulfur dioxide. Preferred feed gases for use herein are combustion product gases. Representative are combustion gases obtained: (1) from the burning of a carbonaceous liquid, a solid fuel or a mixture thereof; (2) from the incineration of a reduced-sulfur-containing gas; (3) or the like. Still more preferred feed gases for use herein are of the class referred to in general in the art as being "waste gases".

The feed gas may also contain sulfur trioxide in minor amounts relative to the sulfur dioxide, i.e., up to about 25 volume percent, based on the sulfur dioxide. Preferably little (less than 500 ppm [weight]) or no sulfur trioxide is present in the feed gas.

Other representative sulfur-dioxide-containing feed gases include stack gas; smelter gas, e.g., ore-roasting gas; partially scrubbed coke-oven gas; impure hydrogen; incinerated sulfur plant tail gas; waste gas; acid gas; sulfuric acid plant tail gas; synthesis gas; flue gas; and the like. A gas which contains a moderate amount of sulfur dioxide, as stated above, and which contains one or more diluent gases, such as carbon dioxide, carbon monoxide, nitrogen, hydrogen, and the like, is a preferred feed.

The makeup solution (fresh scrubbing solution) required herein is an aqueous solution of strong caustic, i.e., of alkali metal hydroxide, carbonate, or a mixture thereof. The concentration may vary from a reasonably dilute (about 0.5 normal) up to a substantially saturated yet pumpable solution, i.e., a solution having a viscosity at temperature below about 100 centipoise.

What is claimed is:

1. In a process for removing sulfur dioxide from a gaseous sulfur dioxide-containing feed by means of a lean aqueous sulfite-containing solution in a gas scrubbing zone, said lean solution comprising regenerated sulfite-containing solution and makeup solution by:
   a. introducing the lean solution into the scrubbing zone;
   b. introducing the feed into the scrubbing zone and into contact with the lean solution to form a fat solution and a resulting gas having a sulfur dioxide content which is less than the sulfur dioxide content of the feed gas;
   c. withdrawing the resulting gas from the gas scrubbing zone;
   d. withdrawing the fat solution from the gas scrubbing zone;
   e. passing the withdrawn fat solution into a stripping zone and forming gaseous sulfur dioxide and said regenerated solution by stripping said fat solution;
   f. withdrawing said sulfur dioxide gas from the stripping zone; and
   g. withdrawing the regenerated solution from the stripping zone and forming said lean solution by adding makeup solution, said makeup solution being aqueous alkaline caustic selected from the group consisting of alkali metal hydroxide, carbonate and mixtures thereof;
the improvement which comprises scrubbing said resulting gas with at least a portion of said makeup solution prior to said addition, said scrubbing being effected by employing at least sufficient of said makeup solution to maintain the process in balance and to provide a degree of gas scrubbing corresponding to at least a single tray in a tray-type gas scrubbing tower, thereby reducing the sulfur dioxide content of the resulting effluent gas stream to a value less than about 75 ppm.

2. The process as in claim 1, wherein said process is a countercurrent gas scrubbing process.

3. The process as in claim 1, wherein the remainder of the gas comprises one or more gases of the group carbon dioxide, carbon monoxide, nitrogen, and hydrogen.

4. In a process wherein sulfur dioxide is scrubbed from a sulfur dioxide-containing gas stream in countercurrent contact in a gas scrubbing zone with a lean aqueous sulfite-containing solution comprising regenerated sulfite-containing solution and makeup solution, said makeup being aqueous caustic solution selected from the group consisting of alkali metal hydroxide, carbonate and mixtures thereof, wherein a scrubbed gas product of reduced sulfur dioxide content and used scrubbing solution are withdrawn from said zone, wherein sulfur dioxide is removed from said used solution to produce said regenerated solution, and wherein said regenerated solution is returned to said zone, the improvement which comprises countercurrently contacting said gas stream with said regenerated solution and then contacting said gas stream with said makeup solution, said scrubbing being effected by employing at least sufficient of said makeup solution to maintain the process in balance and to provide a degree of gas scrubbing corresponding to at least a single tray in a tray-type gas scrubbing tower, thereby reducing the sulfur dioxide content of the resulting effluent gas stream to a value less than about 75 ppm.

* * * * *